(12) United States Patent
Onken et al.

(10) Patent No.: US 9,261,136 B2
(45) Date of Patent: Feb. 16, 2016

(54) HYDRODYNAMIC TUMBLE DISC BEARING SYSTEM

(75) Inventors: Volker Onken, Kaltenkirchen (DE); Willem Potze, Geldrop (NL); Bernardus Wilhelmus Johannes Wassink, Valkenswaard (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 282 days.

(21) Appl. No.: 13/881,897

(22) PCT Filed: Jul. 25, 2011

(86) PCT No.: PCT/IB2011/053308
§ 371 (c)(1),
(2), (4) Date: Apr. 26, 2013

(87) PCT Pub. No.: WO2012/059824
PCT Pub. Date: May 10, 2012

(65) Prior Publication Data
US 2013/0208869 A1    Aug. 15, 2013

(30) Foreign Application Priority Data
Nov. 5, 2010    (EP) ..................................... 10190103

(51) Int. Cl.
| H01J 35/10 | (2006.01) |
| F16C 23/04 | (2006.01) |
| F16C 43/02 | (2006.01) |

(52) U.S. Cl.
CPC .............. *F16C 23/04* (2013.01); *F16C 23/045* (2013.01); *F16C 43/02* (2013.01); *H01J 35/10* (2013.01); *H01J 35/101* (2013.01); *Y10T 29/49648* (2015.01)

(58) Field of Classification Search
CPC ......... H01J 35/10; H01J 35/101; F16C 23/04; F16C 43/02; Y10T 29/49648

USPC .......................................................... 378/132
See application file for complete search history.

(56) References Cited

U.S. PATENT DOCUMENTS

| 3,900,751 A | * | 8/1975 | Holland et al. ............... 378/125 |
| 4,141,606 A | | 2/1979 | Yamamura |

(Continued)

FOREIGN PATENT DOCUMENTS

| CN | 2583429 Y | 10/2003 |
| CN | 101878581 A | 11/2010 |

(Continued)

*Primary Examiner* — Allen C. Ho

(57) ABSTRACT

The invention relates to a tumble disc bearing (100) to provide an efficient axial bearing for a rotating anode (216) of an X-ray source (212) having a tumble disc (102) for axially bearing the rotating anode (216), and a mounting component (120) for supporting the tumble disc (102). The mounting component (120) comprises an inner mounting face (122) for attaching to a supporting structure (194, 204). The mounting component (120) is supported in the tumble disc (102) at a tumble position (140) in which an inner supporting face (104) of the tumble disc (102) matches an outer supporting face (124) of the mounting component (120) such that the tumble disc (102) is enabled to perform a tumble motion in all directions in relation to the mounting component (120). The mounting component (120) is adapted to be inserted in an inserting position (142) traverse to the tumble position (140) into the tumble disc (102). At least one recess (110, 610) at the tumble disc (102) is provided for inserting at least one catch (150, 650) in an axial direction (160) of an anode rotation axis (162) and for engaging with the at least one catch (150, 650) to fixate the tumble disc (102) against a rotational movement (164) in relation to the support structure (194, 204) while maintaining the tumble motion of the tumble disc (102).

20 Claims, 10 Drawing Sheets

(56) References Cited

U.S. PATENT DOCUMENTS

| | | | |
|---|---|---|---|
| 4,670,895 A | 6/1987 | Penato et al. | |
| 5,052,825 A | 10/1991 | Battig | |
| 5,077,775 A * | 12/1991 | Vetter | 378/132 |
| 5,416,820 A | 5/1995 | Wiel et al. | |
| 5,676,468 A | 10/1997 | Webb | |
| 5,709,483 A | 1/1998 | Martinie | |
| 5,838,762 A * | 11/1998 | Ganin et al. | 378/125 |
| 5,838,763 A * | 11/1998 | Hiller et al. | 378/133 |
| 6,064,719 A | 5/2000 | Vetter et al. | |
| 6,480,571 B1 * | 11/2002 | Andrews | 378/131 |
| 6,494,622 B2 * | 12/2002 | Plesh, Sr. | B65G 39/20 384/542 |
| 6,947,523 B2 * | 9/2005 | Guthlein et al. | 378/130 |
| 7,215,740 B2 * | 5/2007 | Fukushima et al. | 378/126 |
| 7,223,019 B2 * | 5/2007 | Hoppe | 384/192 |
| 7,286,643 B2 * | 10/2007 | Hebert et al. | 378/125 |
| 7,637,668 B2 * | 12/2009 | Yamashita | 384/538 |
| 7,672,434 B2 * | 3/2010 | Saint-Martin et al. | 378/132 |
| 7,933,382 B2 * | 4/2011 | Hunt et al. | 378/132 |
| 8,964,941 B2 * | 2/2015 | Onken | 378/132 |
| 9,014,337 B2 * | 4/2015 | Luebcke | H01J 35/101 378/132 |
| 2001/0031106 A1 | 10/2001 | Plesh | |
| 2003/0061679 A1 | 4/2003 | Chang et al. | |
| 2005/0123225 A1 | 6/2005 | Hoppe | |
| 2005/0135561 A1 | 6/2005 | Hebert et al. | |
| 2008/0085072 A1 | 4/2008 | Yamashita | |

FOREIGN PATENT DOCUMENTS

| | | |
|---|---|---|
| GB | 169978 | 10/1920 |
| WO | 2012059824 A1 | 5/2012 |

* cited by examiner

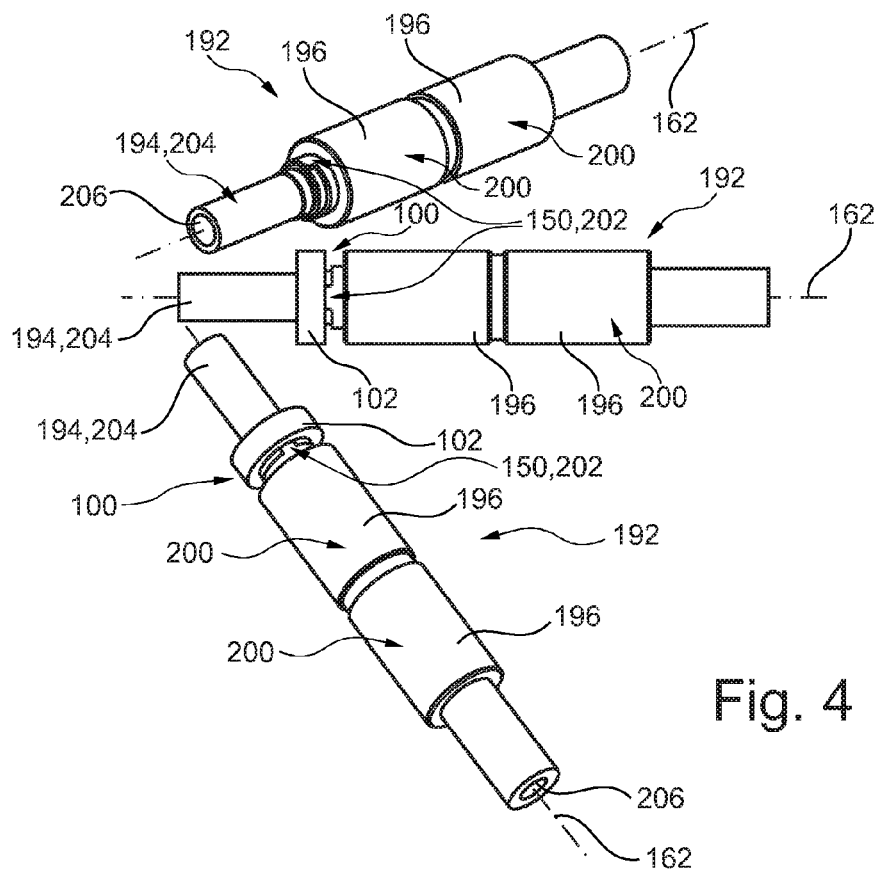
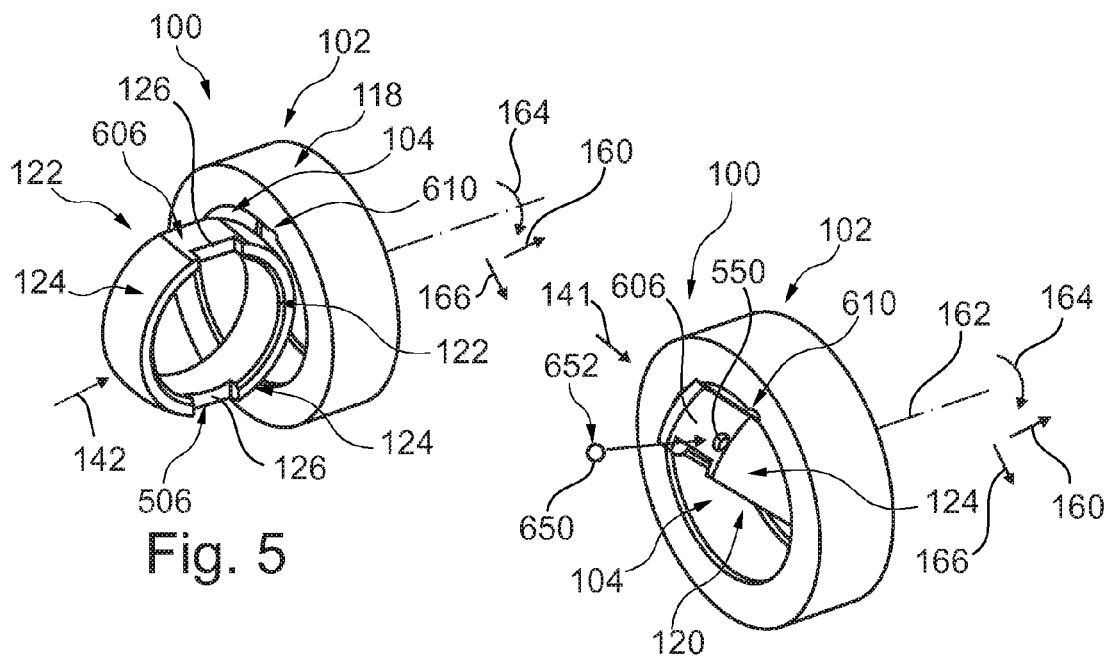
Fig. 4
Fig. 5
Fig. 6

HYDRODYNAMIC TUMBLE DISC BEARING SYSTEM

FIELD OF THE INVENTION

The present invention relates to a tumble disc bearing, a bearing system comprising the tumble disc bearing, an X-ray tube comprising the system as well as an X-ray imaging system comprising the tumble disc bearing, and the system, respectively, and a method of mounting a respective tumble disc bearing to a shaft of an X-ray tube.

BACKGROUND OF THE INVENTION

For example, X-ray tubes with a rotating anode have a bearing system for bearing the rotating anode, in particular a fluid metal lubricated system with radial and axial bearings, supported on both sides of the bearing.

U.S. Pat. No. 6,064,719 relates to a rotary-anode X-ray tube having an axial tumble disc bearing system to reduce the friction losses in a hydrodynamic bearing system. The tumble disc bearing system comprises an inner bearing member and an outer bearing member, the inner bearing member having three bearing portions, wherein the first or the second bearing portion can perform a swinging motion about the axis of rotation during the rotation of the two bearing members. The tumble disc may be to connect to a still standing shaft with a pin engaging with a recess of the shaft.

SUMMARY OF THE INVENTION

There is a need for a bearing of a rotating anode of an X-ray source which is easy to manufacture.

It may be seen as an object of the invention to provide an improved, flexible and efficient axial bearing for a rotating anode of an X-ray source.

The object of the present invention is solved by the subject-matter of the independent claims, wherein further embodiments are incorporated in the dependent claims. It should be noted that the following described aspects of the invention apply also for the tumble disc bearing, the bearing system, the X-ray tube, the use of the tumble disc bearing and the bearing system for an X-ray tube as well as the method of mounting a respective tumble disc bearing to a shaft of an X-ray tube.

According to an aspect of the invention, a tumble disc bearing comprises a tumble disc for axially bearing a rotating anode of an X-ray source and a mounting component for supporting the tumble disc. The mounting component comprises an inner mounting face for attaching to a support structure and an outer supporting face. The tumble disc comprises an inner supporting face matching the outer supporting face. The mounting component is supported in the tumble disc at a tumble disc position in which the inner supporting face matches the outer supporting face such that the tumble disc is enabled to perform a tumble motion in all directions in relation to the mounting component The mounting component is adapted to be inserted in an inserting position traverse to the tumble position into the tumble disc. At least one recess at the tumble disc is provided for inserting at least one catch in an axial direction of an anode rotation axis and for engaging with at least one catch to fixate the tumble disc against a rotational movement in relation to the support structure while maintaining the tumble motion of the tumble disc.

According to a further aspect of the invention, the outer supporting face of the mounting component comprises at least one supporting cut-out adapted to support the at least one catch and the bearing may comprise the at least one catch to fixate the tumble disc. The at least one supporting cut-out may be adapted to insert the mounting component in the tumble disc at the inserting position.

According to a further aspect of the invention, the inner supporting face comprises at least one inserting cut-out adapted to insert the mounting component in the inserting position. The at least one recess at the tumble disc is provided for engaging with the at least one catch in an axial direction of an anode rotation axis to fixate the tumble disc against the rotational movement in relation to the support structure while maintaining the tumble motion of the tumble disc.

Such a tumble disc bearing allows for an efficient cooling of the rotating anode in the X-ray source, since the support structure may incorporate a cavity to receive a cooling fluid for cooling the rotating anode, which is possible since the support structure does not comprise a recess or a through-hole for the connection of the tumble disc. The supporting structure may not be weakened by such a recess according to the invention, since the tumble disc is attached to the support structure via a mounting component which is fixedly attached to the support structure in a flexible and efficient way such as by threadedly engaging the support structure, wherein the tumble disc is supported by the mounting component while maintaining the tumble motion of the tumble disc in all directions in relation to the mounting component. Assembling such a tumble disc bearing and mounting the bearing to the shaft may be more cost-efficient than attaching a tumble disc to a support structure by means of a pin engaging with a through hole or a recess of the support structure. The support structure, the tumble disc, and the mounting component may be manufactured as one piece structures not weakened by through holes or recesses for attaching the tumble disc to the support structure which may be a shaft. Furthermore an efficient cooling may be enabled by such a bearing adapted to engage a shaft designed as a tube with a cavity, in particular with openings on both supported sides, for cooling the anode of the X-ray source, which may be an X-ray tube, since the shaft may be designed with no recesses traverse to the longitudinal axis of the shaft but only the cavity in a longitudinal direction of the shaft axis.

According to another aspect of the invention a method of mounting a respective tumble disc bearing to a shaft of an X-ray tube is provided, comprising an inserting of the mounting component at an inserting position in at least one inserting cut-out of the inner supporting face of the tumble disc or at at least one supporting cut-out in the outer supporting face of the mounting component, pivoting the mounting component in the tumble disc into a tumble position in which the inner supporting face of the tumble disc matches the outer supporting face of the mounting component such that the tumble disc is enabled to perform a tumble motion in all directions in relation to the mounting component, positioning the mounting component with there to attached tumble disc axially onto the shaft, and fixing the tumble disc against a rotational movement in relation to the shaft while maintaining the tumble motion of the tumble disc by engaging the at least one recess at the tumble disc with at least one catch, and according to a further aspect at the shaft in the axial direction.

This method may provide for an effective mounting of a tumble disc bearing to a shaft of an X-ray tube with a rotating anode since the tumble disc, the mounting component and the shaft may be manufactured as one piece structures and easily assembled, while enabling an efficient cooling of the rotating anode of the X-ray tube, since the shaft may be designed as a shaft comprising a cavity for cooling the anode.

It should be noted that the present invention is not limited to one tumble disc bearing, one bearing system, one X-ray tube, and one X-ray imaging system, but also may include a plurality of tumble disc bearings, a plurality of bearing systems, a plurality of X-ray tubes, and a plurality of X-ray imaging systems.

According to an aspect of the invention a tumble disc bearing is provided with at least one outer bearing face for axially bearing a rotating anode of an X-ray source, wherein the tumble disc is attached to a support structure via a mounting component, and wherein the tumble disc is fixed against a rotational movement in relation to the support structure by a catch engaging with at least one recess at the tumble disc, while the tumble disc is adapted to adjust itself in such a way that the at least one outer bearing face of the tumble disc and at least one corresponding bearing face of the rotating anode are aligned if the anode rotates around the anode rotation axis, wherein the adjustment is enabled by a tumble motion of the tumble disc in relation to the mounting component. The catch may be inserted in an axial direction of the anode rotation axis at the at least one recess.

These and other aspects of the present invention will become apparent from and elucidated with reference to the embodiments described hereinafter.

BRIEF DESCRIPTION OF THE DRAWINGS

Exemplary embodiments of the invention will be described in the following drawings.

FIG. 4 schematically shows two perspective views and one side view of a bearing system having a tumble disc bearing according to exemplary embodiments of the invention.

FIG. 5 schematically shows a perspective view of a tumble disc bearing according to an exemplary embodiment of the invention.

FIG. 6 schematically shows a perspective view of a tumble disc bearing according to another exemplary embodiment of the invention.

DETAILED DESCRIPTION OF EMBODIMENTS

Figure 1:
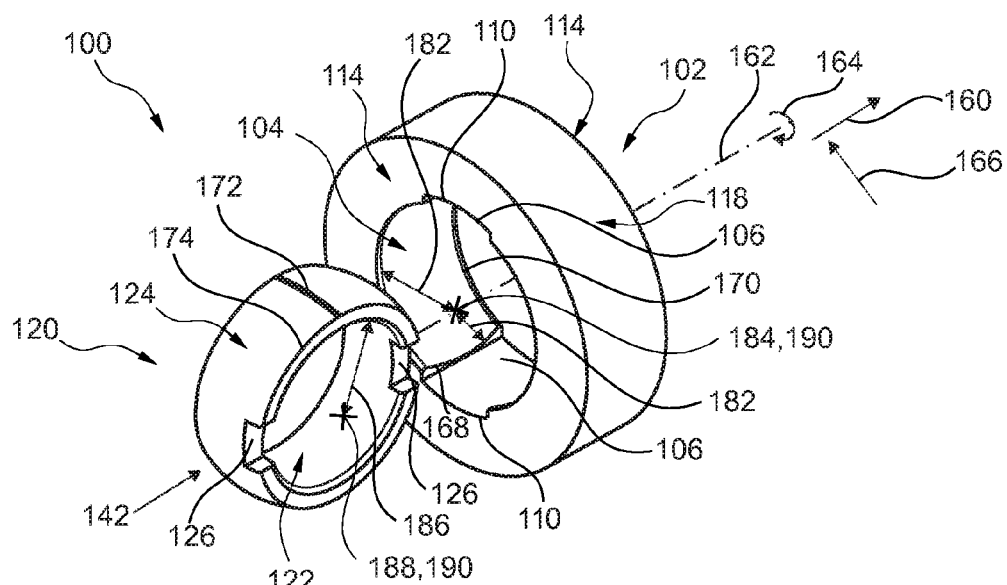
FIG. 1 schematically shows a perspective view of a tumble disc bearing according to an exemplary embodiment of the invention.

FIG. 1 illustrates a tumble disc bearing 100 with a tumble disc 102 for axially bearing a rotating anode (not shown) of an X-ray source, in particular an X-ray tube, and a mounting component 120 for supporting the tumble disc. The mounting component 120 comprises an inner mounting face 122 for attaching to a support structure (not shown), and comprises an outer supporting face 124. The tumble disc 102 comprises an inner supporting face 104 matching the outer supporting face 124. The mounting component 120 is supported in the tumble disc 102 at a tumble position (140, see FIGS. 2 and 3) in which the inner supporting face 104 matches the outer supporting face 124 such that the tumble disc 102 is enabled to perform a tumble motion in all directions in relation to the mounting component 120. The mounting component 120 is adapted to he inserted in an inserting position 142 traverse to the tumble position 140 into the tumble disc 102. The inner supporting face 104 comprises two inserting cut-outs 106 arranged opposite to each other and adapted to insert the mounting component 120 in an inserting position 142 traverse to the tumble position into the tumble disc 102, in a traverse direction 166. It is also possible to provide, at least one inserting cut-out 106 adapted to insert the mounting component 120 in the inserting position 142.

According to the invention at least one recess 110 is provided at the tumble disc 102 for engaging with at least one catch (not shown, see FIGS. 2 and 3), possibly in an axial direction 160 of an anode rotation axis 162, to fixate the tumble disc 102 against a rotational movement 164 in relation to the support structure while maintaining the tumble motion of the tumble disc 102. The tumble disc 102 may also be fixated against a rotational movement opposite to the rotational movement 164 depicted in FIG. 1. According to a further aspect of the invention, the at least one recess 110 at the tumble disc 102 is provided for inserting the at least one catch.

The tumble disc 102 may comprise at least one outer bearing face 114 for axially bearing the rotating anode of the X-ray source. In FIG. 1

According to another aspect of the invention, the tumble disc 102 adjusts itself in such a way that the at least one outer bearing face 114 of the tumble disc 102 and at least one corresponding bearing face (not shown, see FIG. 2) of the rotating anode are aligned if the anode rotates around the anode rotation axis 162, wherein the adjustment is enabled by the tumble motion.

The mounting component 120 may be a mounting ring, and the tumble disc bearing 100 may be a hydrodynamic tumble disc bearing.

According to a further aspect of the invention the at least one recess 110 is provided by the at least one inserting cut-out 106.

The at least one recess 110 may be a recess at the tumble disc different from the at least one inserting cut-out 106, particularly a recess in the axial direction at the tumble disc (102) according to another aspect of the invention.

According to another embodiment of the invention the mounting component 120 comprises at least one mounting recess 126 provided to be engaged with a tool for fixedly attaching the mounting component 120 in the axial direction 160 to the support structure while the mounting component 120 is positioned in the tumble position.

According to another aspect of the invention, the inner supporting face 104 comprises a first curvature 168 in the axial direction 160 and a second curvature 170 traverse to the axial direction 160 in the traverse direction 166. The degree of the first curvature 168 is equal to the degree of the second curvature 170.

According to a further aspect of the invention, the outer supporting face 124 comprises a first matching curvature 172 in the axial direction 160 and a second matching curvature 174 traverse to the axial direction 160 such that in the tumble position the first curvature 168 corresponds to the first matching curvature 172 and the second curvature 170 corresponds to the second matching curvature 174 such that the tumble disc 102 is enabled to perform a tumble motion in all directions in relation to the mounting component 120. The tumble disc 102 may be enabled to perform a tumble motion in all directions on the outer supporting surface 124 in relation to the mounting component 120. The degree of the first curvature 168 may match the degree of the first matching curvature 172, and the degree of the second curvature 170 may match the degree of the second matching curvature 174.

According to another aspect of the invention, the degree of the second curvature 170 essentially matches the degree of the second matching curvature 174 such that a homogeneous space (see also FIG. 3) or a uniform distance (see also FIG. 3) is provided between the inner supporting face 104 and the outer supporting face 124.

According to another aspect of the invention the degree of the first curvature 168 differs from the degree of the second curvature 170.

According to a further exemplary embodiment of the invention, the inner supporting face 104 is part of a fictive first spherical surface of a first sphere with a first sphere radius 182 and a first sphere middle point 184 on the anode rotation axis 162. At the tumble position the outer supporting face 124 may be part of a fictive second spherical surface of a second sphere with a second sphere radius 186 and a second sphere middle point 188 on the anode rotation axis 162, wherein one of the first sphere middle point 184 and the second sphere middle point 188 forms a tumble point 190 of the tumble disc 102 on the anode rotation axis 162.

According to another aspect of the invention, the tumble disc 102 is enabled to perform a tumble motion in all directions around the tumble point 190 in the tumble position 140.

According to a further exemplary embodiment of the invention, the inner supporting face 104 has a concave shape, and the outer supporting face 124 has a convex shape matching the concave shape of the inner supporting face 104.

According to further aspects of the invention the tumble disc 102 of the axial tumble disc bearing 100 may be connected onto the supporting structure, particularly on a still standing shaft, by a ball-shaped mounting ring 120, such that a ball-shape connection between the tumble disc 102 and the mounting component 120 may be provided enabling the tumble disc 102 to perform a tumbling motion in all directions on the ball shape of the mounting ring 120. The tumble disc 102 may have a ball shape on the inside which fits to a ball shape on the outside of the mounting ring 120. The tumble disc 102 may comprise a cut-out 106 for mounting the mounting ring 120. The tumble disc 102 may further comprise at least one cut-out 110 for locking the rotation in a catch of the supporting structure, particularly a shaft. The tumble disc system comprising the tumble disc 102 attached to the mounting ring 102 may be mounted to the shaft by axially accessing two mounting recesses of the mounting ring 102 by respective tools.

According to another aspect of the invention, the tumble disc 102 is connected with a ball shape on a mounting ring 120, such that the tumble disc 102 can move in all directions on a point in the ideal center of the support structure, in particular of a shaft. The system of the tumble disc 102 and the mounting ring 120 may be fixed on the shaft with a thread, which is set tight in a direction of the anode rotation 164.

According to another aspect of the invention, the tumble disc 102 has two cut-outs 106 arranged opposite to each other and adapted for mounting the mounting component 120, which cut-outs are 106 also used to fixate the rotation movement of the tumble disc 102 on the shaft.

Figure 2:
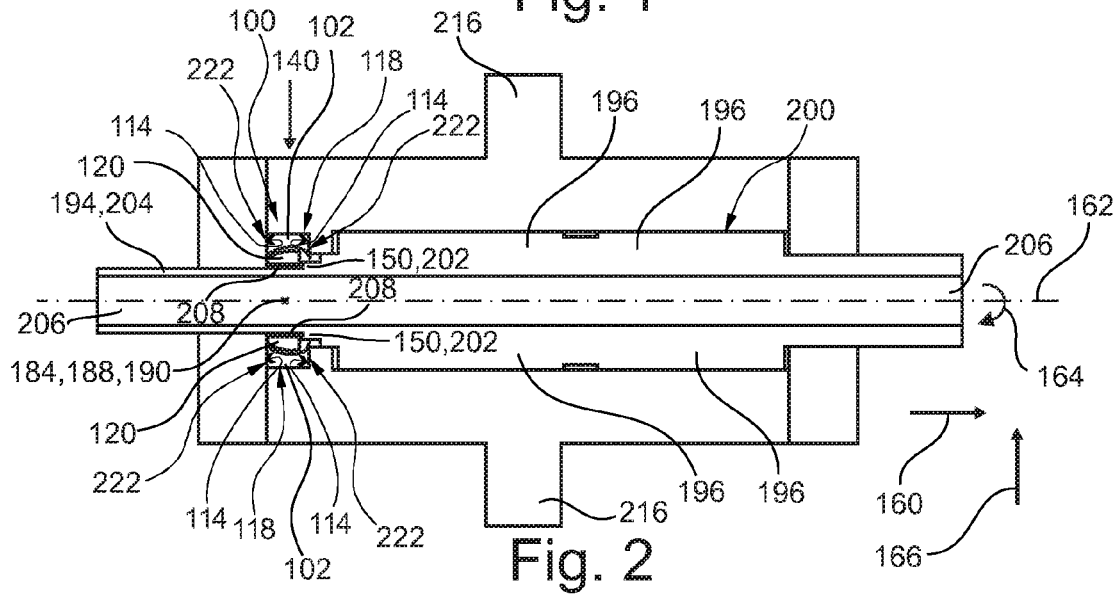
FIG. 2 schematically shows a cross-sectional view of a tumble disc bearing on a support structure bearing part of a rotating anode of an X-ray source according to another embodiment of the invention.

FIG. 2 illustrates the tumble disc bearing 100 according to FIG. 1 which is mounted to a support structure 194, 204, particularly a shaft 204, of part of a rotating anode 216 of an X-ray source such as an X-ray tube. The support structure 194, 204 may be fixed on one or on both sides to a tube envelope (not shown, see FIG. 4) of an X-ray tube. Two radial bearing components 196, 196 with outer bearing faces 200 are provided for radially bearing the rotating anode 216 of the X-ray source. At least one protrusion 150, 202 is provided at the support structure 194, 204, wherein the mounting component 120 is fixedly attached to the shaft 204, and wherein the at least one protrusion 150, 202 is provided as the at least one catch 150 engaging the at least one recess 110 shown in FIG. 1.

According to an aspect of the invention, the shaft 204 comprises a cavity 206 for receiving a cooling agent for cooling the X-ray source, and the rotating anode 216, respectively. The cavity 206 may be an end hole as shown in FIG. 2 or a blind hole from one side of the shaft 194, 204. The cooling agent may be a liquid agent such as oil, a waterbased liquid or a liquid metal. The cooling agent may be a gaseous agent such as air or nitrogen.

According to another aspect of the invention the tumble disc 102 adjusts itself in such a way that the at least one outer bearing face 114 of the tumble disc 102 and at least one corresponding bearing face 222, 222 of the rotating anode 216 are aligned, if the anode 216 rotates around the anode rotation axis 162, wherein the adjustment is enabled by the tumble motion according to the invention as depicted in FIG. 1.

According to a further embodiment of the invention, the shaft 204 comprises an outer thread 208 and the inner mounting face 122 of the mounting component 120 comprises an inner thread (not shown, see FIG. 3) for engaging with the outer thread 208 to an engagement position. The mounting component 120 is enabled to be mounted in a tight set way to the shaft 204. In other words, the system of the tumble disc 102 and the mounting component 120 is fixed on the shaft 204 with a thread, wherein the thread is set tight in the direction of the anode rotational movement 164.

According to another embodiment of the invention for retaining the mounting component 120 to the shaft 204 in the engagement position while enabling a tight set mounting of the mounting component 120 to the shaft, the shaft 204 may comprise a retainer (not shown), selected from the group consisting of a nut, a groove and tongue system or a welding between shaft 204 and mounting component 120. The retainer may be provided by the protrusion 150, 202 in form of the catch 150, according to another aspect of the invention.

Figure 3:
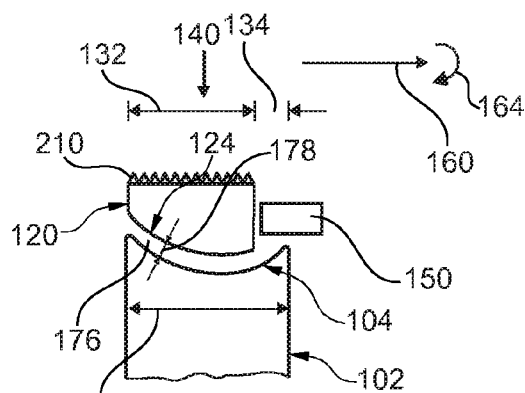
FIG. 3 schematically shows a cross-sectional view of a part of a tumble disc bearing of FIG. 2.

FIG. 3 illustrates an enlarged part of the tumble disc bearing according to FIG. 2, showing the above-mentioned inner thread 210 of the inner mounting face 124 of the mounting component 120.

The tumble disc 102 and the mounting component 120 are illustrated in the tumble position 140, wherein, according to a further embodiment of the invention, the axial width 132 of the mounting component 120 is smaller than the axial width 130 of the tumble disc 102 such that a mounting component 120 is positioned offset at an offset distance 134, to the tumble disc 102 enabling a catch 150 to engage with the at least one recess (not shown, see FIG. 1) while maintaining the tumble motion.

The catch 150 may be part of the support structure (not shown, see FIG. 2) according to an aspect of the invention.

According to a further aspect of the invention the catch 150 is part of the mounting component 120.

According to another aspect of the invention the catch 150 is a separate part, which may be mounted between the mounting component 120 and the support structure (not shown, see FIG. 2). The catch 150 may be formed as a ring which may be moved or placed onto the support structure which may be a shaft as depicted in FIG. 2.

It is noted, that an offset may be provided also on the opposite side of the tumble disc 102 compared to the illustration of FIG. 3, or that two offsets may be provided when positioning the mounting component 120 in the middle of the tumble disc 102. An offset distance 134 may therefore be provided also on the opposite side of the tumble disc 102 compared to the illustration according to FIG. 3 or on both sides of the tumble disc 102, if the mounting component 120 is positioned in the middle or central at the tumble disc 102.

FIG. 3 also illustrates the homogeneous space 176, and the uniform distance 178, respectively, as described in the above-mentioned embodiments and aspects of the invention, and provided between the inner supporting face 104 and the outer supporting face 124. It is noted that the degree of a first curvature of the inner supporting face 104 essentially matches the degree of a first matching curvature of the outer supporting face 124 of the mounting component 120 as mentioned above and as illustrated in FIG. 3. The above mentioned embodiments and aspects described and illustrated in FIG. 3 may be incorporated in the embodiments and aspects described for FIGS. 1 and 2.

FIG. 4 illustrates a perspective view of the bearing system 192 with a support structure 194, 204 in form of a shaft 204 with at least one radial bearing component 196, 196 with an outer bearing face 200 for radially bearing a rotating anode of an X-ray source and at least one protrusion 202, 150 at the support structure 194, 204 according to a further embodiment of the invention.

According to a further embodiment of the invention the at least one protrusion 202, 150 is provided as the at least one catch 150 adapted to engage an at least one recess at the tumble disc to fixated the tumble disc against a rotational movement in relation to the support structure 194, 204 while maintaining the tumble motion of the tumble disc as illustrated in FIG. 1 to FIG. 3.

A cavity 206 is provided in the shaft 204 according to another embodiment of the invention for receiving a cooling agent for cooling the X-ray source, and the rotating anode of the X-ray source, respectively.

Below the above-mentioned perspective view a cross-sectional view of the bearing system 192 is shown with a tumble disc bearing 100 according to FIG. 1 to FIG. 3, wherein a mounting component of the bearing 100 is fixedly attached to the shaft 204, and the at least one protrusion 202, 150 in form of the catch 150 is engaging the at least one recess of the tumble disc bearing 100.

Below the above-mentioned cross-sectional view of the bearing system 192 another perspective view of the bearing system 192 with the tumble disc bearing 100 according to FIG. 1 to FIG. 3 is shown in FIG. 4.

It should be noted that all illustrations of FIG. 4 depict a bearing system 192 wherein according to an embodiment of the invention shaft 204 comprises a cavity 206 for receiving a cooling agent for cooling the X-ray source, wherein the cooling agent may be a liquid agent such as oil, a water-based liquid or a liquid metal and/or a gaseous agent such as air or nitrogen. The shaft 204 may comprise an outer thread and the inner mounting face of the tumble disc bearing 100 may comprise an inner thread for engaging with the outer thread to an engagement position, and the mounting component may be enabled to be mounted in a tight set way to the shaft 204 according to further aspects of the invention.

According to another aspect of the invention, the mounting component of the tumble disc bearing 100 may be attached to the shaft 204 by utilizing a fixation by a press-fit fixation, a welding fixation, a fixation with additional nut or a fixation with a short bolt.

According to a further embodiment of the invention the shaft 204 may comprise the above-mentioned retainer adapted to retain the mounting component to the shaft 204 in the engagement position to enable a tight set mounting of the mounting component to the shaft 204.

The shaft 204 may have a hole for receiving the cooling liquid and with supported ends on one or both sides according to another aspect of the invention.

According to a further aspect of the invention, the shaft 204 comprises a thread for connecting of the tumble disc system incorporating the mounting component 120 with a thereto attached tumble disc 102.

According to another aspect of the invention the shaft 204 may comprise the catch 150 for locking the rotation of the tumble disc 102.

FIG. 5 illustrates a tumble disc bearing 100 with a tumble disc 102 for axially bearing a rotating anode (not shown, see FIGS. 10, 18 to 20) of an X-ray source, and a mounting component 120 for supporting the tumble disc. The mounting component 120 comprises an inner mounting face 122 for attaching to a support structure (not shown, see FIGS. 10, 18 to 20), and comprises an outer supporting face 124. The tumble disc 102 comprises an inner supporting face 104 matching the outer supporting face 124. The mounting component 120 is supported in the tumble disc 102 at a tumble position (not shown, see FIG. 7) in which the inner supporting face 104 matches the outer supporting face 124 such that the tumble disc 102 is enabled to perform a tumble motion in all directions in relation to the mounting component 120. The mounting component 120 is adapted to be inserted in an inserting position 142 traverse to the tumble position 140 into the tumble disc 102.

According to the invention at least one recess 610 at the tumble disc 102 is provided for inserting at least one catch (not shown, see FIG. 6, FIG. 8) in an axial direction 160 of an anode rotation axis 162 and for engaging with the at least one catch to fixate the tumble disc 102 against a rotational movement 164 in relation to the support structure while maintaining the tumble motion of the tumble disc 102.

According to another aspect of the invention, the outer supporting face 124 comprises at least one supporting cut-out 606 adapted to support the at least one catch 650. The at least one supporting cut-out 606 is adapted to insert the mounting component 120 at the inserting position 142 as shown in FIG. 5.

The mounting component 120 in the tumble disc may be pivoted about a traverse direction 166 transversal to the axial direction 160 towards the anode rotation axis 162 into a catch arranging position 141 (see FIG. 6) in which part of the inner supporting face 104 of the tumble disc 102 matches the outer supporting face 124 of the mounting component 120 and the supporting cut-out 606 of the outer supporting face 124 to support the at least one catch 650 is outside the tumble disc 102.

The supporting cut-out 606 may be designed such that the mounting component 120 may have a dimension of the smallest inner diameter of the tumble disc 102 such that the mounting component 120 may be inserted in the tumble disc 102 with no cut-out needed in the tumble disc. This may lead to a simpler and more efficient manufacturing of the tumble disc.

The mounting cut-outs 606 according to FIG. 5 may have a catch recess 550 as shown in FIG. 6 and a ball-shaped catch 650 or a catch with another shape which may be positioned at the supporting cut-out 606 in the catch recess 550 between an inserting cut-out 610 of the tumble disc 102 and the mounting ring 120 in a tumble position.

According to FIG. 6 the catch for blocking the movement in rotational direction may be designed as a ball between the mounting component 120 and the tumble disc 102 according to an aspect of the invention, wherein the tumble disc 102 has a special cut-out 610, which allows the mounting of the ball. The ball for the catch between mounting component 120 or a mounting ring 120 and the tumble disc 102 is filled in the mounting ring 120 by rotating the mounting ring 120 to the tumble disc 102 in a traverse axis 166 which is rectangular to the rotation axis 162 of the bearing.

Hence, an alternative solution to the tumble disc bearing of FIG. 1 is proposed by the embodiments according to FIG. 5 and FIG. 6 which propose an axial tumble disc bearing unit with a tumble disc 102, which is connected to a still standing shaft on a ball-shaped ring which allows movements in all rotational directions, wherein the rotation in the direction of the bearing rotation 164 is blocked by a catch which may be a ball and may be part of the tumble disc bearing 100. This alternative embodiments of the invention propose the mounting of the parts of the tumble disc bearing 100, such as the catch, for blocking the movement in rotational direction 164 and the fixation to the shaft of the bearing. A tumble disc system with such a tumble disc bearing may be mounted with only axial access for tools to the shaft.

According to another aspect of the invention, the mounting component 120 comprises at least one mounting recess 126 to be engaged with a tool for fixedly attaching the mounting component 120 in the axial direction 160 to the supporting structure (not shown) while the mounting component 120 is positioned in the tumble position 140.

According to a further aspect of the invention, the inner supporting face 104 according to the embodiments of FIGS. 6 to 12 and 14 to 18 comprises a first curvature 168 in the axial direction 160 and a second curvature 170 traverse to the axial direction 160, and the degree of the first curvature 168 is equal to the degree of the second curvature 170 (see FIG. 1).

According to another aspect of the invention, the tumble disc bearing according to the embodiments of FIGS. 6 to 12 and 14 to 18 comprises an inner supporting face 104 of the tumble disc 102 with at least one inserting cut-out 106 adapted to insert the mounting component 120 in the inserting position 142, wherein at least one recess 110 at the tumble disc 102 is provided for engaging with the at least catch 150 in an axial direction 160 of an anode rotation axis 162 to fixate the tumble disc 102 against the rotational movement 164 in relation to the support structure 194, 204 while maintaining the tumble motion of the tumble disc 102 (see FIGS. 1 to 3). In the tumble position 140 the axial width 132 of the mounting component 120 may be smaller than the axial width 130 of the tumble disc 102 such that the mounting component 120 is positioned offset to the tumble disc 102 enabling a catch 150 to engage with the at least one recess 110 while maintaining the tumble motion (see FIG. 3). Thus, the alternative exemplary embodiment according to FIG. 6 to FIG. 18 and the embodiment according to FIG. 1 to FIG. 4 may be combined with each other.

FIG. 6 shows a perspective view of a tumble disc bearing according to FIG. 5, wherein the supporting cut-out 606 comprises at least one catch recess 550 for supporting the at least one catch 650.

According to an aspect of the invention, at least one catch 650 to fixate the tumble disc 102 is provided, wherein the at least one catch 650 comprises a catch engagement face 652 adapted to engage with or to punctually engage with the matching face (not shown, see FIG. 8) of the at least one recess 610. The engagement face 652 may comprise a first face curvature and a second face curvature or may have a spherical shape as shown in FIG. 6.

Such a tumble disc bearing according to FIG. 6 with a ball-shaped catch may enable for an optimized tumble motion of the tumble disc, as the catch, which is supported in the supporting cut-out 606 of the outer supporting face 124 of the mounting component 120, particularly in the catch recess 550, may punctually engage with the at least one recess 610 at the tumble disc 102 to fixate the tumble disc 102 against a rotational movement 164 in relation to the support structure.

Figure 7:
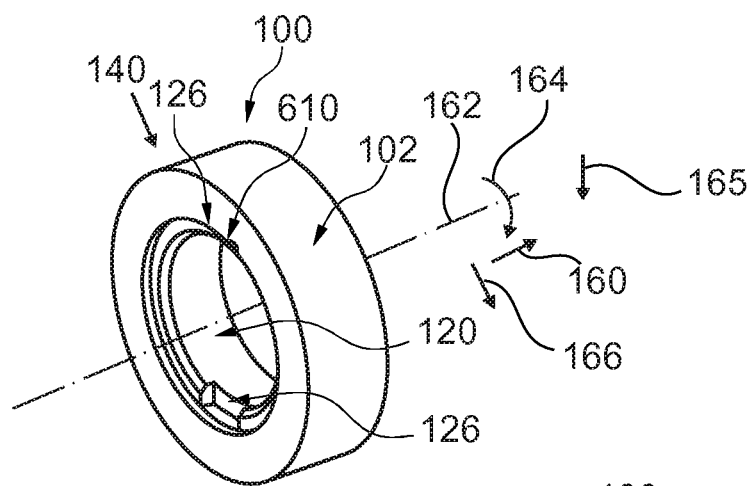
FIG. 7 schematically shows a perspective view of the tumble disc bearing of FIG. 5 or FIG. 6 with the mounting component mounted to a tumble disc in a tumble position.

FIG. 7 shows a perspective view of a tumble disc bearing with a mounting component 120 supported in the tumble disc 102 at a tumble position 140 in which the inner supporting face matches the outer supporting face such that the tumble disc 102 is enabled to perform a tumble motion in all directions in relation to the mounting component 120. The recess 610 at the tumble disc 102 is provided for engaging with the at least one catch (not shown, see FIG. 6) to fixate the tumble disc 102 against the rotational movement 164 in relation to the support structure (not shown) while maintaining the tumble motion of the tumble disc 102. Thus the rotation in direction of the bearing rotation 164 is blocked by the catch. The mounting component 120 has been inserted in an inserting position 144 traverse to the tumble position 140 into the tumble disc 102 (see FIG. 5) by moving in the mounting component 120 and rotating the mounting component 120 around an upright radial direction 165.

Figure 8:
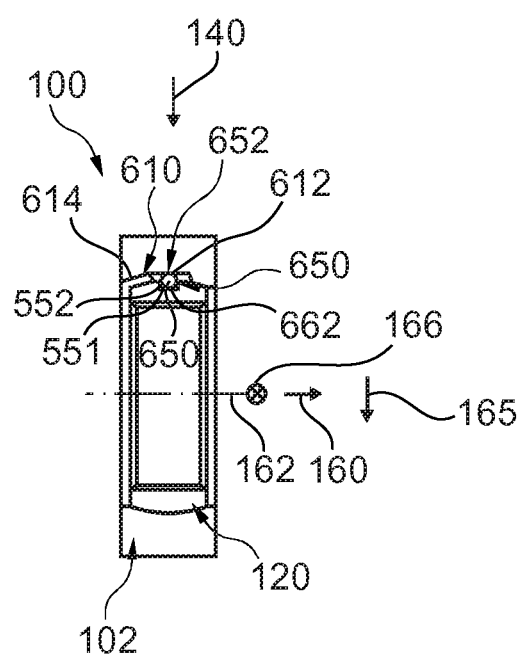
FIG. 8 schematically shows a cross-sectional side view of the tumble disc bearing of FIG. 6 to FIG. 7.
Figure 9:
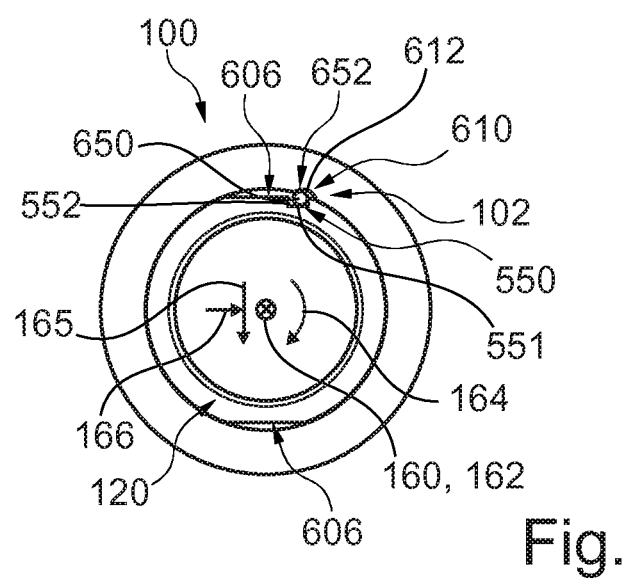
FIG. 9 schematically shows a cross-sectional front view of the tumble disc bearing according to FIG. 6 to FIG. 8.

FIG. 8 schematically shows a cross-sectional side view and FIG. 9 schematically shows a cross-sectional front view of the tumble disc bearing 100 of FIG. 6. One of the supporting cut-outs 606 comprises a catch recess 550 for supporting the at least one catch 650. The at least one catch recess 550 has a cylindrical shape comprising a base surface 551 for supporting the at least one catch 550 at the mounting component in a radial direction 165 at a tumble position 140, and a surrounding surface 552 for supporting the at least one catch 650 at the mounting component 120 in the axial direction 160 and in the rotation direction 164 of the rotating anode at the tumble position 140. The at least one catch 650 has a catch supporting face 662 adapted to support the at least one catch 650 at the at least one supporting cut-out 606. The catch supporting face 662 may have a cylindrical shape as shown in FIGS. 6, 8 and 9, comprising a catch base 551 adapted to radially support the at least one catch 650 at the base surface 551 at the tumble position 140, and a catch surrounding surface 552 adapted to axially and rotationally support the at least one catch 650 at the surrounding surface 552 at the tumble position 140. The at least one catch 650 may be inserted in the axial direction 160 in an inserting portion 614 of the at least one recess 610.

According to an aspect of the invention, the tumble disc bearing comprises at least one catch 650 to fixate the tumble disc 102, which catch 650 comprises a catch engagement face 652 to engage with or to punctually engage with a matching face 612 of the at least one recess 610. The engagement face 652 may comprise a first face curvature and a second face curvature or may be ball-shaped with a spherical shape as shown in FIGS. 6, 8 and 9. The tumble disc 102 is blocked with the catch 650 in a bearing rotation direction 164 to the inner mounting component 120, which may be a mounting ring, and as such a mounting ring may be fixed to a shaft of a rotating anode, the tumble disc is blocked with respect to this shaft.

Figure 10:
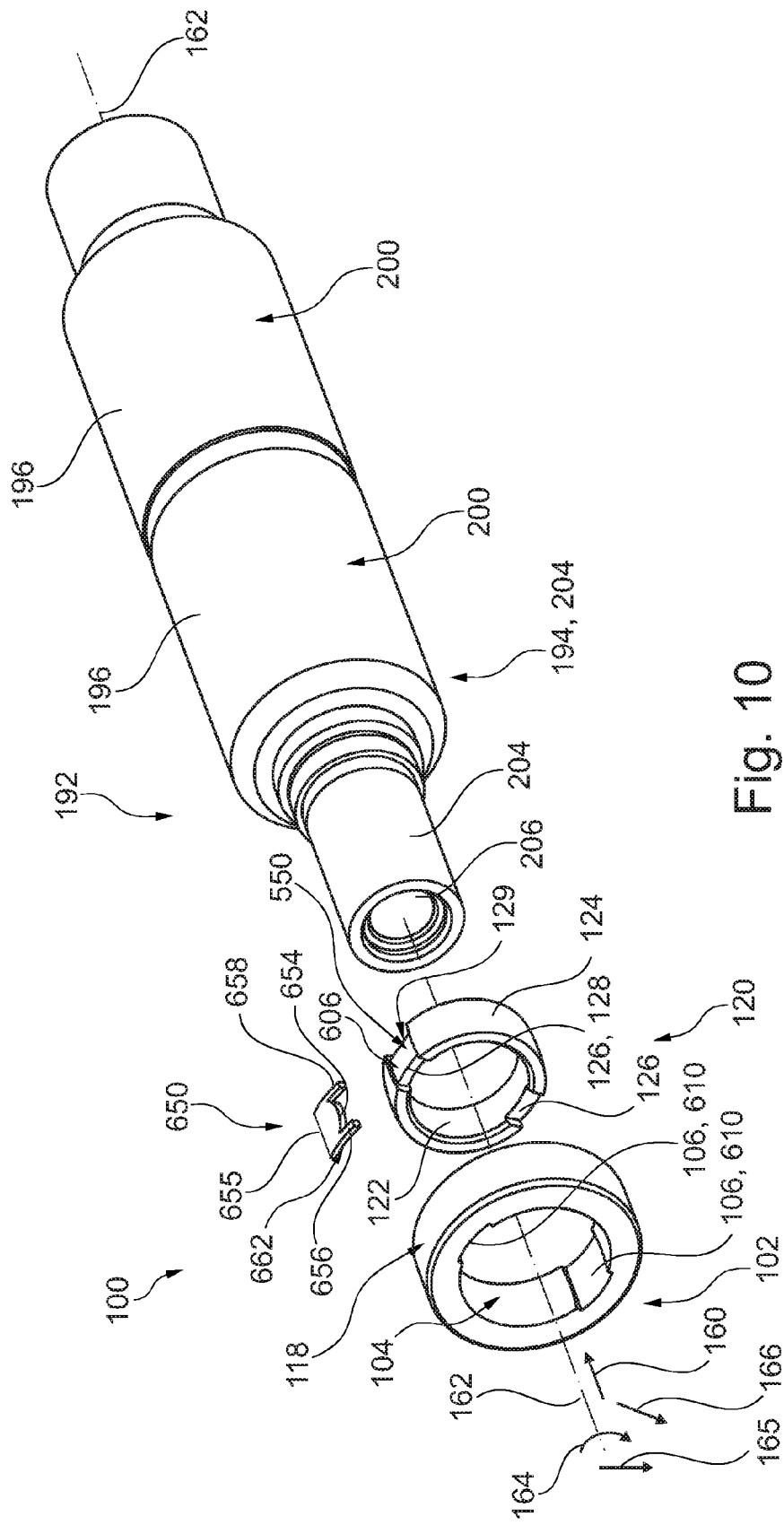
FIG. 10 schematically shows a perspective exploded view of a bearing system having a tumble disc bearing according to an exemplary embodiment of the invention.
Figure 20:
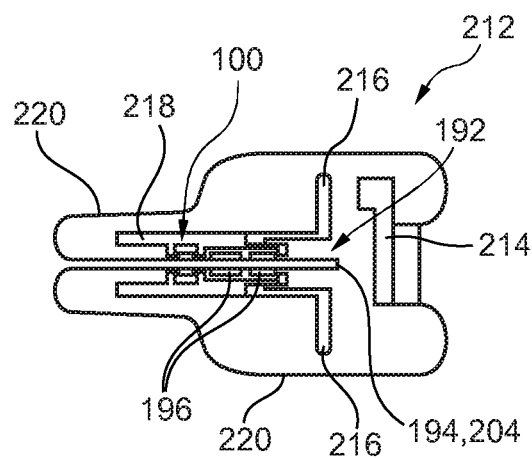
FIG. 20 schematically shows a cross-sectional view of an X-ray tube with a bearing system of FIG. 4 according to another exemplary embodiment of the invention.

FIG. 10 schematically shows a cross-sectional exploded view of a bearing system 192 with a support structure 194, 204 with a shaft 204, at least one radial bearing component 196 with an outer bearing face 200 for radially bearing a rotating anode (not shown) of an X-ray source (not shown), and a tumble disc bearing with a mounting component 120 to be fixedly attached to the shaft 204, wherein the shaft 204 comprises a cavity 206 for receiving a cooling agent for cooling an X-ray source (212, see FIG. 20). The shaft 204 may also not comprise a cavity for receiving a cooling agent for cooling the X-ray source according to an aspect of the invention. The system 192 may comprise at least one protrusion (not shown in FIG. 10, but in FIGS. 3, 4) at the support structure 194, 204, which protrusion may be provided as at least one catch engaging with the at least one recess 106, 610 of the tumble disc 102. The inner supporting face 104 of the tumble disc 102 comprises at least one inserting cut-out 106, 610 adapted to insert the mounting component 120 in an inserting position.

According to an aspect of the invention, at least one catch 650 is provided to fixate the tumble disc 102, which catch 650 comprises at least one link 656, 658 adapted to be engaged with at least one supporting recess 128, 129 of the supporting cut-out 606 to support the at least one catch 650 at the supporting cut-out 606 in the axial direction 160 at the tumble position. The catch 650 further comprises a first side 654 adapted to abut against the first abutment face 609 (see FIG. 11, FIG. 12) of the supporting cut-out 606 to support the at least one catch 650 at the supporting cut-out 606 in the rotational direction 164 at the tumble position. The catch 650 further comprises a second side 655 adapted to abut against a second abutment face 670 (see FIG. 11, FIG. 12) of the recess 610 to support the tumble disc 102 at the at least one catch 650 in the rotation direction 164.

Figure 11:
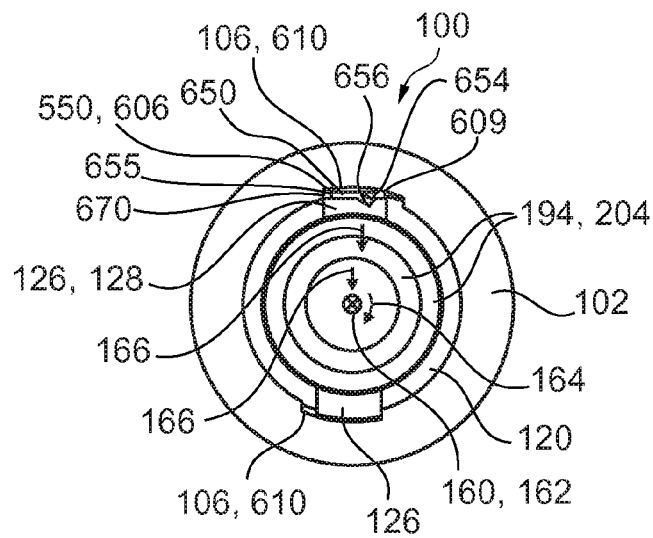
FIG. 11 schematically shows a cross-sectional front view of the bearing system according to FIG. 10.
Figure 12:
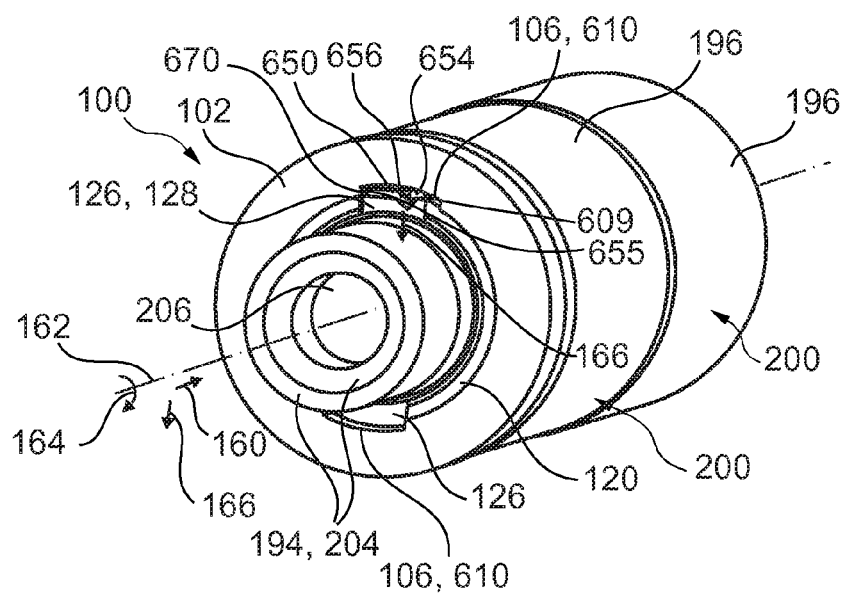
FIG. 12 schematically shows a perspective view of the bearing system according to FIG. 11.
Figure 13:
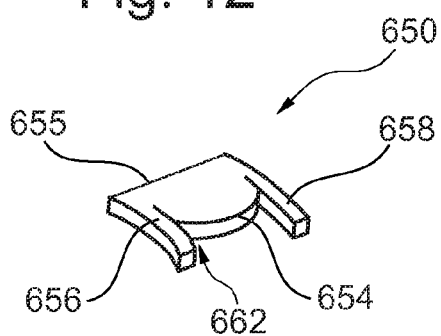
FIG. 13 schematically shows a perspective view of a catch according to another exemplary embodiment of the invention.

As is also shown in FIG. 11 and FIG. 12 which illustrate a front cross-sectional view and a perspective view of the bearing system with the tumble disc bearing according to FIG. 10, the first side 654, the second side 655, the first abutment face 609, and the second abutment face 670 extend in a traverse direction 166 transversal to the rotation direction 164 and extend towards the anode rotation axis 162 at the tumble position. The at least one catch 650 may further comprise a catch base 662 (see FIG. 13) adapted to support the at least one catch 650 at a base of the supporting cut-out 606 in a radial direction 165 at the tumble position 140.

According to a further aspect of the invention, the at least one link 656, 658 may be a locking tongue. Each link 156, 158 may be adapted to be engaged with the at least one corresponding locking recess 128, 129 by moving the link 656 in a traverse direction 166 transversal to the axial direction 160 and towards the anode rotation axis 162. The first side 654 may have a curved face adapted to punctually abut against the first abutment face 609 for making angular movements of the tumble disc 102 easier. The second side 655 may be adapted to punctually abut (possibly at two points) against the second abutment face 670. Thus, a three point tumble support of the catch may be provided which advantageously enables the tumble disc 102 to maintain its tumble motion while being blocked against the rotational movement 164 in relation to the mounting component 120, which is fixedly connectable to the support structure 194, 204, by the catch 650 abutting at two points at a second side 655 against the second abutment face 670 of the tumble disc 102 and by the catch 650 abutting punctually via a first side 654 of the catch 650 against the first abutment face 609 of the mounting component 120 for making angular movements of the tumble disc easier.

Figure 14:
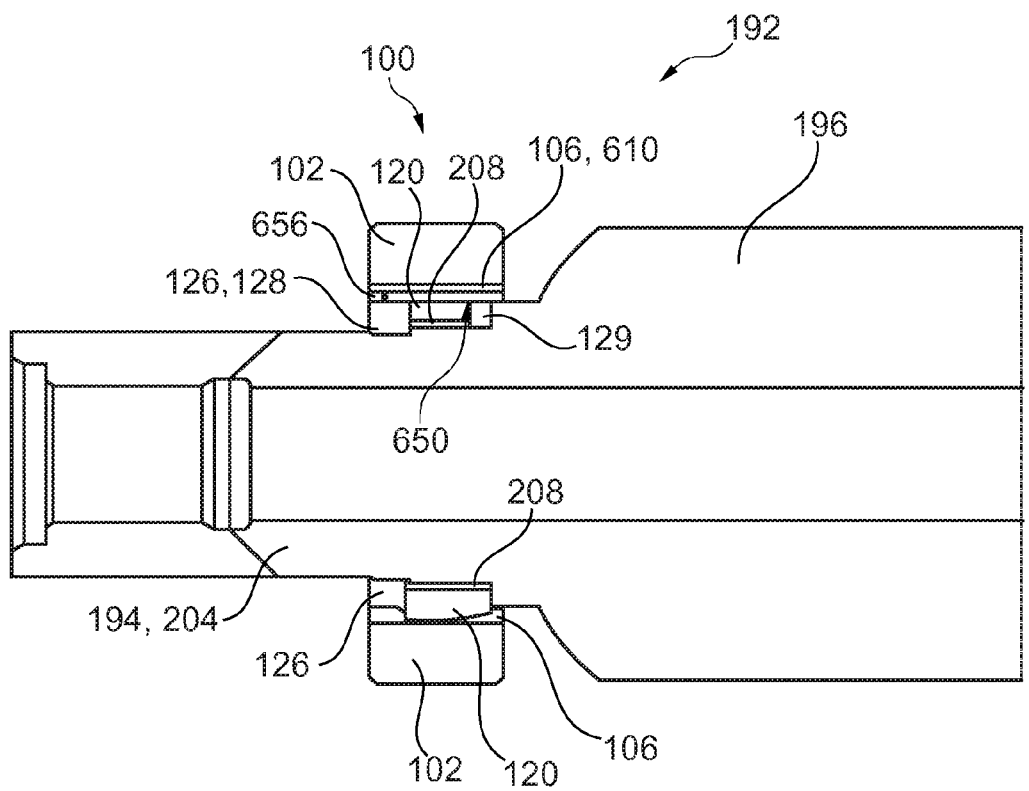
FIG. 14 schematically shows a cross-sectional side view of part of a bearing system with a tumble disc bearing on a support structure according to another exemplary embodiment of the invention.
Figure 15:
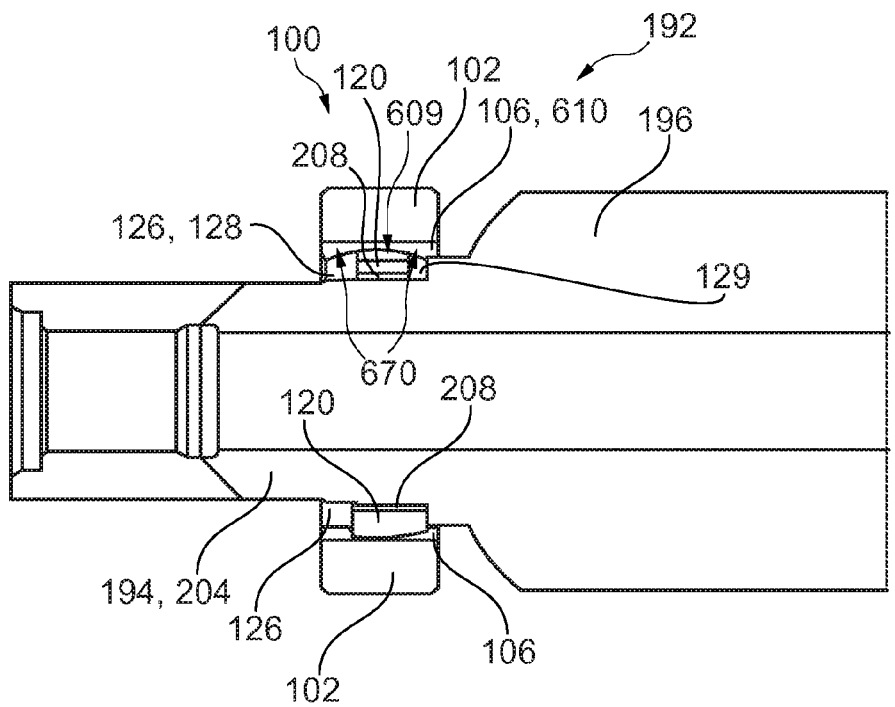
FIG. 15 schematically shows a cross-sectional side view of a bearing system with a tumble disc bearing on a support structure according to the embodiment of the invention of the partial view of FIG. 14.

One link 658 may be longer than another link 656, such that when inserting the link in the supporting cut-out 606 at the tumble position the longer link 658 may engage with the mounting component 120 in a respective locking recess 129 of the mounting component to support the catch 650 at the mounting component 120 in an axial direction against falling out in the inserting position, and the shorter link 656 may be bent in a vertical or radial direction 166 towards the anode rotation axis 162 in the locking recess 128 of the mounting component 120 to fix or to the support the at least one catch 650 in the axial direction 160 at the inserting direction (see also FIGS. 14 and 15).

FIG. 14 and FIG. 15 schematically show a cross-sectional side view of the bearing system 192 with the tumble disc bearing 100 according to FIG. 10, wherein the catch 650 with the at least one link 656 and respective locking recesses 128, 129 is shown in FIG. 14, and the first abutment face 609 of the mounting component 120 and the second abutment face 670 of the tumble disc 102 is illustrated in FIG. 15.

Figure 16:
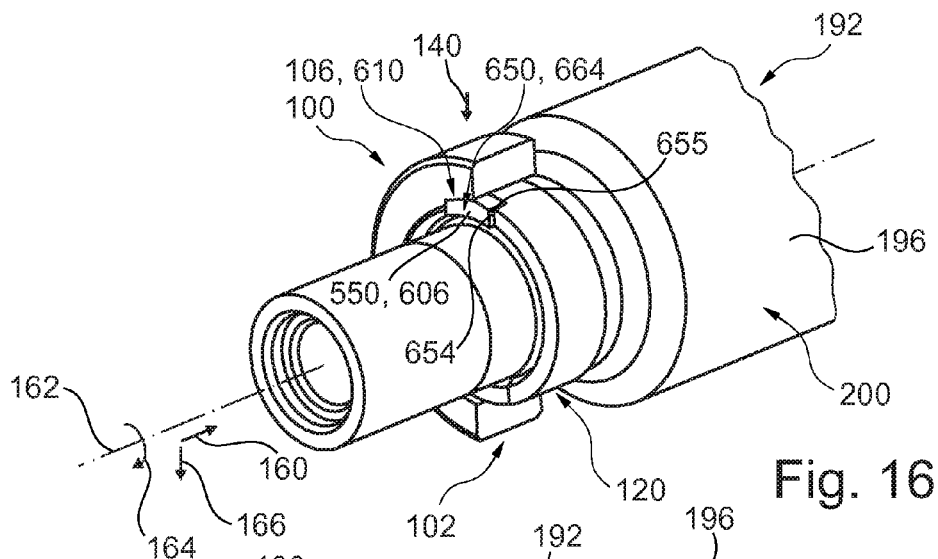
FIG. 16 schematically shows a perspective view of part of a bearing system with a tumble disc bearing according to another exemplary embodiment of the invention.
Figure 17:
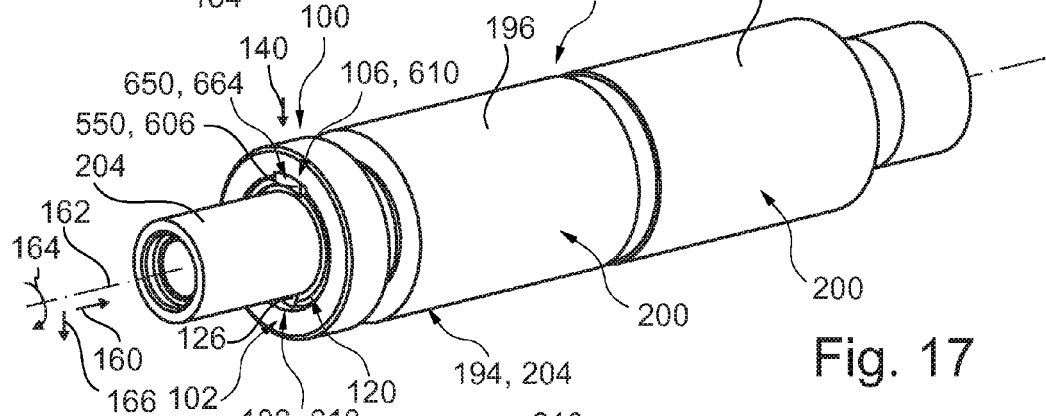
FIG. 17 schematically shows a perspective view of the bearing system of FIG. 16 in full view.

FIG. 16 schematically shows a perspective view of part of a bearing system 192 with a tumble disc bearing 100 according to a further embodiment of the invention. FIG. 17 schematically shows a perspective view of the whole part of the bearing system 192 with the tumble disc bearing 100 according to FIG. 16. At least one catch 650 is provided to fixate the tumble disc 102, wherein at the tumble position the at least one supporting cut-out 550, 606 is extending in the axial direction 160. The at least one catch 650 is a latch 664 adapted to axially engage with the supporting cut-out 550, 606. The latch 664 comprises a first side 654 adapted to abut against the first abutment face of the supporting cut-out 606 to support the latch 664 at the supporting cut-out 606 in the rotation direction 164 at the tumble position 140. The latch 664 further comprises a second side 655 adapted to abut against a second abutment face of the at least one recess 106, 610 to support the tumble disc 102 at the latch 664 in the rotation direction 164. The latch 664 further comprises a catch engagement face 652 adapted to engage with or to punctually engage with a matching face of the at least one recess 106, 610. The engagement face 652 may comprise a first face curvature, and a second face curvature to enable a tumble motion of the tumble disc 102 while fixing the tumble disc 102 against a rotational movement 164 in relation to the support structure 194, 204. The degree of the first face curvature may match a degree of a first curvature 168 of the inner supporting face 104 of the tumble disc 102, and the degree of the second face curvature may match a degree of a second curvature 170 of the inner supporting face 104 (see also FIG. 1). The first side 654, the second side 655, the first abutment face, and the second abutment face may extend in a traverse direction 166 transversal to the rotation direction 164 and extend towards the anode rotation axis 162 at the tumble position.

According to an aspect of the invention, the latch 664 is adapted to be welded at the mounting component 120 at the supporting cut-out 606. The latch 664 may be designed as a wedge, as a block, as a pin, as a cylinder, or any other structure adapted to fixate the tumble disc 102 against the rotational movement 164 in relation to the support structure 194, 204 while maintaining the tumble motion of the tumble disc 102.

Figure 18:
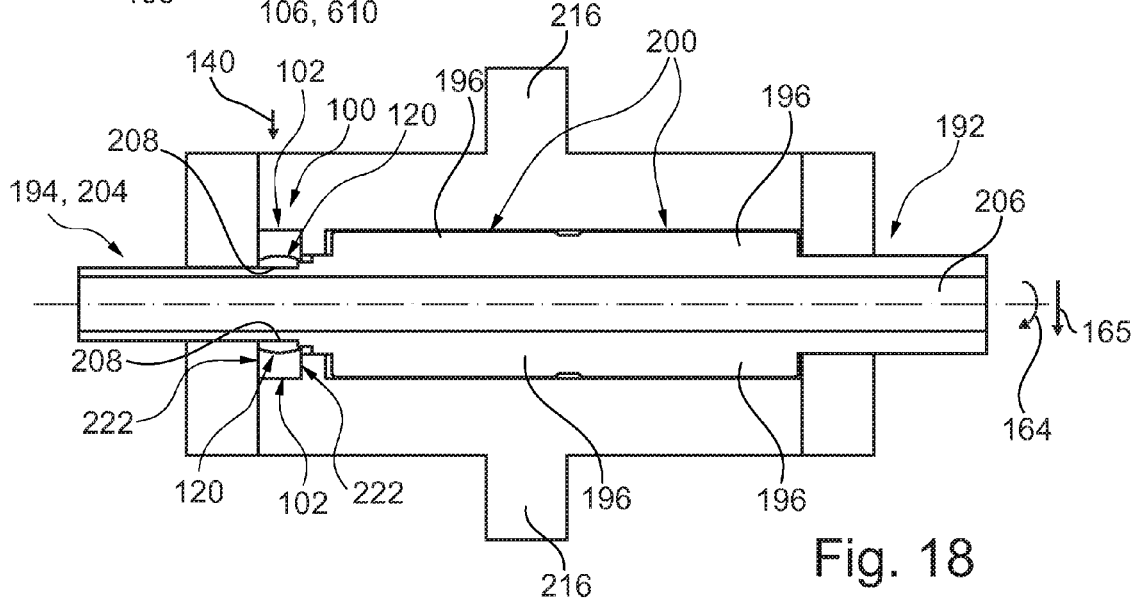
FIG. 18 schematically shows a cross-sectional side view of a tumble disc bearing on a support structure bearing part of a rotating anode of an X-ray source according to another exemplary embodiment of the invention.

FIG. 18 schematically shows a cross-sectional side view of a bearing system 192 comprising a tumble disc bearing 100 according to the exemplary embodiments shown in FIG. 5 to FIG. 17. The bearing system 192 according to FIG. 18 has a support structure 194, 204 in form of a shaft 204, at least one radial bearing component 196, with an outer bearing face 200 for radially bearing a rotating anode 216 of an X-ray source (not shown). The mounting component 120 is fixedly attached to the shaft 204 and/or the shaft 204 comprises a cavity 206 for receiving a cooling agent for cooling the X-ray source.

According to an aspect of the invention, at least one protrusion at the support structure may be provided (shown in FIGS. 3, 4), wherein the at least one protrusion is provided as at least one catch for engaging at least one recess to fixate the tumble disc against a rotational movement in relation to the support structure while maintaining the tumble motion of the tumble disc.

According to a further aspect of the invention, the shaft 204 comprises an outer thread 208, wherein the inner mounting face comprises an inner thread for engaging with the outer thread 208 to an engagement position. The mounting component 120 is enabled to be mounted in a tight set way to the shaft 204. The shaft 204 may comprise a retainer, adapted to retain the mounting component 120 to the shaft 204 in the engagement position to enable a tight set mounting of the mounting component 120 to the shaft 204.

Figure 19:
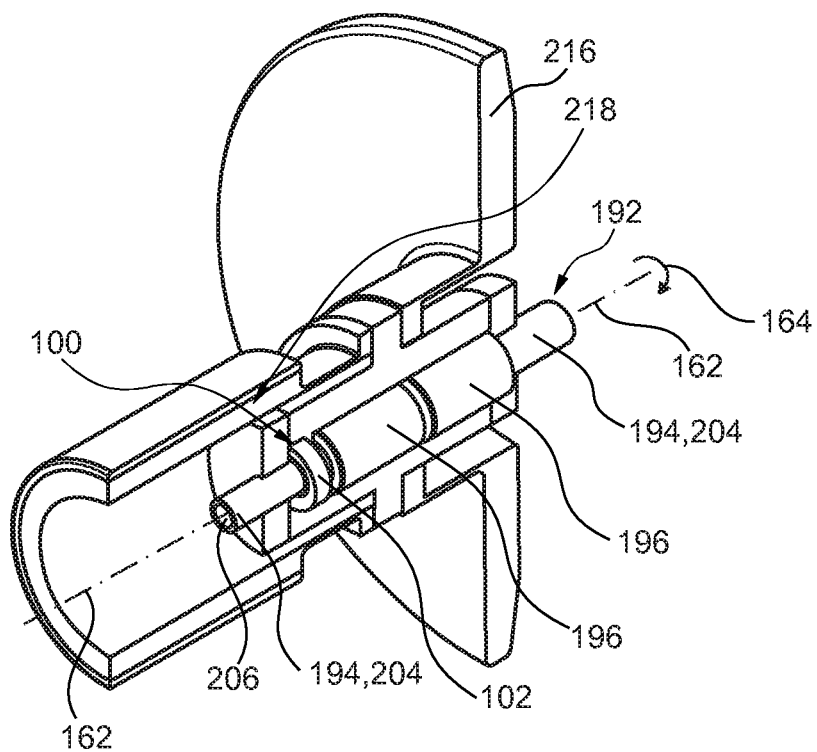
FIG. 19 schematically shows a cross-sectional view of the bearing system of FIG. 4 with a rotating anode of an X-ray source supported by the bearing system according to another exemplary embodiment of the invention.

FIG. 19 illustrates a rotating anode 216 of an X-ray source with a rotor 218 for driving the rotating anode 216 and a bearing system 192 according to the exemplary embodiments of the invention depicted in FIG. 4 with a tumble disc bearing 100 according to the exemplary embodiments of the invention depicted in FIGS. 1-3. Two radial bearing components 196, 196 with outer bearing faces 200 for radially bearing the rotating anode 216 of an X-ray source are provided according to an embodiment of the invention. The tumble disc 102 of the tumble disc bearing 100 is axially bearing the rotating anode 216 and may adjust itself in such a way that the at least one outer bearing face of the tumble disc and at least one corresponding bearing face of the rotating anode 216 are aligned if the anode 216 rotates around the anode rotation axis 162, wherein the adjustment may be enabled by the tumble motion of the tumble disc 102 according an exemplary embodiment of the invention.

FIG. 20 illustrates an X-ray tube 212 according to an exemplary embodiment of the invention, comprising a cathode 214, a rotating anode 216, a rotor 218 for driving the rotating anode 216, a bearing system 192 according to the above-mentioned exemplary embodiments and aspects of the invention, and an envelope 220 housing the cathode 214, the rotating anode 216, the rotor 218, and the bearing system 192.

According to a further aspect of the invention, the use of a tumble disc bearing 100 and a bearing system 192 according to any one of the above-mentioned exemplary embodiments for an X-ray tube 212 is provided.

According to a further aspect of the invention, the use of a tumble disc bearing according to the above-mentioned exemplary embodiments and aspects of the invention, in particular the embodiments of FIG. 1 to FIG. 3, for an X-ray tube 212 is provided.

According to a further aspect of the invention, the use of a bearing system 192 according to the above-mentioned exemplary embodiments and aspects of the invention, in particular the embodiments of FIG. 4, is provided for an X-ray tube 212.

Figure 21:
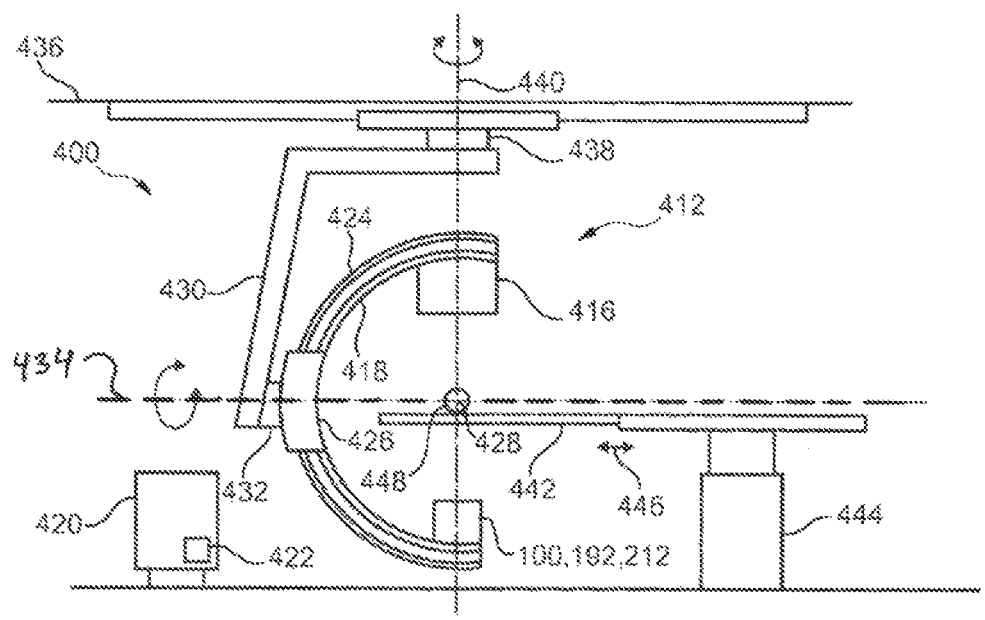
FIG. 21 schematically shows a cross-sectional view of an X-ray imaging system with a tumble disc bearing of FIGS. 1-3, and with a bearing system according to FIG. 4, respectively, according to another embodiment of the invention.

FIG. 21 illustrates an X-ray imaging system 400 comprising an X-ray source 212 according to an exemplary embodiment of the invention, with a tumble disc bearing 100 and a bearing system 192 according to the above-mentioned exemplary embodiments and aspects of the invention, a detector 416, a processing unit 420, and an object receiving device 442. The X-ray imaging system 400 is adapted to acquire information about an object of interest and comprises an X-ray imaging acquisition device 412 having the X-ray source 212 and the detector 416. A support 418 is provided. The support 418 refers to structural load bearing components, to covering components such as housings of structural elements, and to housings for components such as the X-ray source 212 and the detector 416. An interface 422 is provided at the processing unit 420.

The X-ray imaging acquisition device 412 is shown with a so-called C-arm structure, wherein the X-ray source 212 and the detector 416 are arranged on opposite ends of a C-arm 424. The C-arm 424 is assembled by a sleeve-like structure 426 which allows a rotational sliding movement of the C-arm 424 around a central point 428. The sleeve-like structure 426 is attached to a support arm 430 by a rotatable attachment structure 432 enabling a rotation of the C-arm 424 around a horizontal axis 434. The support arm 430 may be mounted to a ceiling 436 by a support 438 enabling a rotational movement around a vertical axis 440. For requiring X-ray image data, the X-ray source 212 and the detector 416 may be positioned at different positions and rotated around several axes.

The object receiving device 442 may be a table for receiving a patient and may be adapted in relation to its height by being supported by an adaptable stand 444 which allows for lowering and moving upward the table. The object receiving device 442 may be moved in a horizontal direction indicated by double arrow 446. An object of interest, illustrated as a ball-like element 448, may be positioned in different positions with a ratio to the C-arm. The object of interest 448 may be a patient arranged on the table.

The processing unit 420 may be connected to the X-ray source 212 and the detector 416 and to other controllable components, for example to actuators allowing for the above-described movements of the C-arm 424 and the table 442.

The X-ray imaging acquisition device 412 is designed for acquiring X-ray image data of a region of interest on the object 448, wherein the system processing unit 420 is adapted to control the X-ray source 212 and the detector 416. The system interface 422 is designed for providing the acquired image data, for example to a user by a display.

According to a further aspect of the invention a computer tomography (CT) system is provided, comprising an X-ray source with a device according to any one of the above and below mentioned aspects and exemplary embodiments of the invention. The CT system may comprise a tumble disc bearing according to the above and below mentioned aspects and exemplary embodiments of the invention and/or a bearing system according to the above and below mentioned aspects and exemplary embodiments of the invention.

Figure 22:
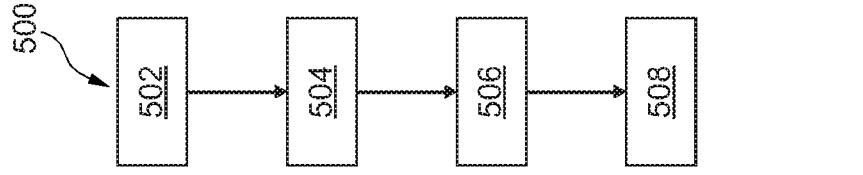
FIG. 22 schematically shows a flow-chart of a method of mounting a tumble disc bearing to a shaft of an X-ray tube according to an exemplary embodiment of the invention.

FIG. 22 illustrates a flow-chart of a method 500 of mounting a tumble disc bearing according to the above-mentioned embodiments to a shaft of an X-ray tube which comprises the steps of inserting 502 a mounting component at the insert position in the at least one inserting cut-out of the tumble disc, pivoting 504 the mounting component in the tumble disc into a tumble position in which the inner supporting face of the tumble disc matches the outer supporting face of the mounting component such that the tumble disc is enabled to perform a tumble motion in all directions in relation to the mounting component, positioning 506 the mounting component with the thereto attached tumble disc axially onto the shaft, and fixing 508 the tumble disc against a rotational movement in relation to the shaft while maintaining the tumble motion of the tumble disc by engaging at least one recess of the tumble disc with at least one catch at the shaft in the axial direction.

Figure 23:
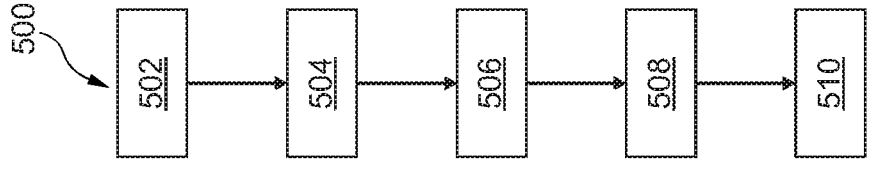
FIG. 23 schematically shows a flow-chart of a further method of mounting a tumble disc bearing to a shaft of an X-ray tube according to another exemplary embodiment of the invention.

FIG. 23 illustrates another method 500 of mounting a tumble disc bearing according to anyone of the above-mentioned embodiments to a shaft of an X-ray tube according to a further aspect of the invention with the steps of inserting 502 the mounting component at the inserting position in the at least one inserting cut-out of the tumble disc, pivoting 504 the mounting component in the tumble disc into a tumble position in which the inner supporting face of the tumble disc matches the outer supporting face of the mounting component such that the tumble disc is enabled to perform a tumble motion in all directions in relation to the mounting component, positioning 506 the mounting component with the thereto attached tumble disc axially onto the shaft, fixing 508 the tumble disc against a rotational movement in relation to the shaft while maintaining the tumble motion of the tumble disc by engaging the at least one recess with at least one catch at the shaft in the axial direction, and attaching 510 the mounting component in the axial direction to the shaft by a tool engaging with an at least one mounting recess of the mounting component.

Figure 24:
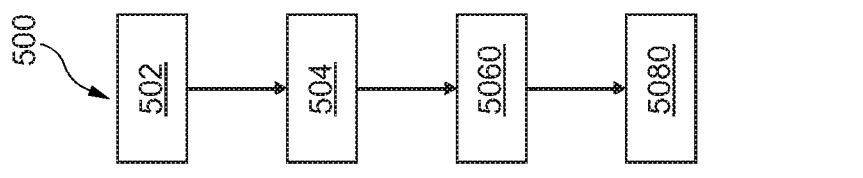
FIG. 24 schematically shows a flow-chart of a method of mounting a tumble disc bearing to a shaft of an X-ray tube according to an exemplary embodiment of the invention.

FIG. 24 illustrates a flow-chart of another method 500 of mounting a tumble disc bearing according to anyone of the above-mentioned embodiments to a shaft of an X-ray tube according to an aspect of the invention with the step of inserting 502 the mounting component at the inserting position in the at least one inserting cut-out or at the at least one supporting cut-out in the outer supporting face, the step of pivoting 504 the mounting component in the tumble disc into a tumble position in which the inner supporting face of the tumble disc matches the outer supporting face of the mounting component such that the tumble disc is enabled to perform a tumble motion in all directions in relation to the mounting component, a step of positioning 5060 the mounting component with the thereto attached tumble disc axially onto the shaft, and a step of fixing 5080 the tumble disc against a rotational movement in relation to the shaft while maintaining the tumble motion of the tumble disc by engaging the at least one recess with at least one catch.

Figure 25:
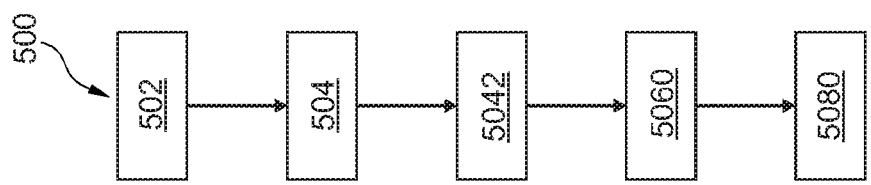
FIG. 25 schematically shows a flow-chart of a further method of mounting a tumble disc bearing to a shaft of an X-ray tube according to another exemplary embodiment of the invention.

FIG. 25 illustrates another method 500 of mounting a tumble disc bearing according to anyone of the above-mentioned embodiments to a shaft of an X-ray tube according to a further aspect of the invention with the step of inserting 502 the mounting component at the inserting position in the at least one inserting cut-out or at the at least one supporting cut-out in the outer supporting face, the step of pivoting 504 the mounting component in the tumble disc into a tumble position in which the inner supporting face of the tumble disc matches the outer supporting face of the mounting component such that the tumble disc is enabled to perform a tumble motion in all directions in relation to the mounting component, a step of arranging 5042 at least one catch at the at least one supporting cut-out, the step of positioning 5060 the mounting component with the thereto attached tumble disc axially onto the shaft, and the step of fixing 5080 the tumble disc against the rotational movement in relation to the shaft while maintaining the tumble motion of the tumble disc by engaging the at least one recess with the at least one catch.

Figure 26:
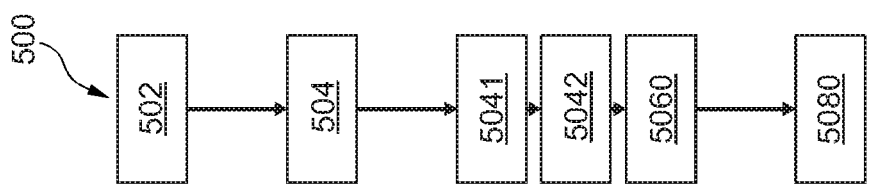
FIG. 26 schematically shows a flow-chart of a further method of mounting a tumble disc bearing to a shaft to an X-ray tube according to another exemplary embodiment of the invention.

FIG. 26 illustrates another method 500 of mounting a tumble disc bearing according to anyone of the above-mentioned embodiments to a shaft of an X-ray tube according to a further aspect of the invention with the step of inserting 502 the mounting component at the inserting position in the at least one inserting cut-out or at the at least one supporting cut-out in the outer supporting face, the step of pivoting 504 the mounting component in the tumble disc into a tumble position in which the inner supporting face of the tumble disc matches the outer supporting face of the mounting component such that the tumble disc is enabled to perform a tumble motion in all directions in relation to the mounting component, a step of pivoting 5041 the mounting component in the tumble disc about a traverse direction transversal to the axial direction towards the anode rotation axis into a catch arranging position in which part of the inner supporting face of the tumble disc matches the outer supporting face of the mounting component, and the supporting cut-out of the outer supporting face to support the at least one catch is outside the tumble disc, the step of arranging 5042 at least one catch at the at least one supporting cut-out, the step of positioning 5060 the mounting component with the thereto attached tumble disc axially onto the shaft, and the step of fixing 5080 the tumble disc against a rotational movement in relation to the shaft while maintaining the tumble motion of the tumble disc by engaging the at least one recess with the at least one catch.

Figure 27:
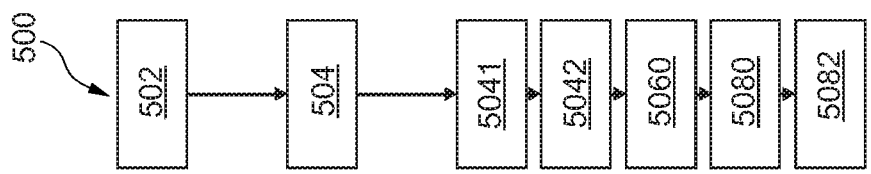
FIG. 27 schematically shows a flow-chart of a further method of mounting a tumble disc bearing to a shaft to an X-ray tube according to another exemplary embodiment of the invention.

FIG. 27 illustrates another method 500 of mounting a tumble disc bearing according to anyone of the above-mentioned embodiments to a shaft of an X-ray tube according to a further aspect of the invention with the step of inserting 502 the mounting component at the inserting position in the at least one inserting cut-out or at the at least one supporting cut-out in the outer supporting face, the step of pivoting 504 the mounting component in the tumble disc into a tumble position in which the inner supporting face of the tumble disc matches the outer supporting face of the mounting component such that the tumble disc is enabled to perform a tumble motion in all directions in relation to the mounting component, the step of pivoting 5041 the mounting component in the tumble disc about a traverse direction transversal to the axial direction towards the anode rotation axis into a catch arranging position in which part of the inner supporting face of the tumble disc matches the outer supporting face of the mounting component, and the supporting cut-out of the outer supporting face to support the at least one catch is outside the tumble disc, the step of arranging 5042 at least one catch at the at least one supporting cut-out, the step of positioning 5060 the mounting component with the thereto attached tumble disc axially onto the shaft, the step of fixing 5080 the tumble disc against a rotational movement in relation to the shaft while maintaining the tumble motion of the tumble disc by engaging the at least one recess with the at least one catch, and a step of engaging 5082 at least one link of the at least one catch with at least one locking recess if in the supporting cut-out by moving the at least one link in a traverse direction transversal to the axial direction 160 and towards the anode rotation axis.

According to further aspects of the invention, the methods 500 of FIG. 24 to FIG. 27 may further comprise the step of attaching 510 the mounting component in the axial direction to the shaft by a tool engaging with the at least one mounting recess of the mounting component.

It has to be noted that exemplary embodiments of the invention are described with reference to different subject-matters. In particular, some exemplary embodiments are described with reference to apparatus type claims whereas other exemplary embodiments are described with reference to the method type claims. However, a person skilled in the art will gather from the above and the following description that, unless otherwise notified, in addition to any combination of features belonging to one type of subject-matter also any combination between features relating to different subject-matters, in particular between features of the apparatus type claims and features of the method type claims, is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practising the claimed invention, from a study of the drawings, the disclosure, and the dependent claims.

In the claims, the word "comprising" does not exclude other elements or steps, and the indefinite article "a" or "an" does not exclude a plurality. A single processor or other units may fulfil the functions of several items recited in the claims. The mere fact that the certain measures are re-cited in mutually different dependent claims does not indicate that a combination of these measures may not be used to advantage. Any reference signs in the claims should not be construed as limiting the scope.

LIST OF REFERENCE SIGNS

100 Tumble disc bearing
102 Tumble disc
104 Inner supporting face
106 Inserting cut-out
110 Recess
114 Outer bearing face of a tumble disc
118 Radial bearing face of tumble disc
120 Mounting component
122 Inner mounting face
124 Outer supporting face
126 Mounting recess
128 Supporting recess
129 Supporting recess
130 Axial width (of tumble disc)
132 Axial width (of mounting component)
134 Offset distance
140 Tumble position
141 Catch arranging position
142 Inserting position
150 Catch
160 Axial direction
162 Anode rotation axis
164 Rotational movement, rotation direction
165 Radial direction
166 Traverse direction
168 First curvature
170 Second curvature
172 First matching curvature
174 Second matching curvature
176 Homogenous space
178 Uniform distance
182 First sphere radius
184 First sphere middle point
186 Second sphere radius
188 Second sphere middle point
190 Tumble point
192 Bearing system
194 Support structure
196 Radial bearing component
200 Outer bearing face of a radial bearing component
202 Protrusion
204 Shaft
206 Cavity
208 Outer thread
210 Inner thread
212 X-ray tube
214 Cathode
216 Anode
218 Rotor
220 Envelope
222 Corresponding bearing face
400 X-ray imaging system
412 X-ray imaging acquisition device
416 Detector
418 Support
424 C-arm
426 Sleeve-like structure
428 Central point
430 Support arm
432 Rotatable attachment structure
434 Horizontal axis 436 Ceiling
438 Support
440 Vertical axis
442 Object receiving device
444 Adaptable stand
446 Double arrow
448 Ball-like element
550 Catch recess, supporting cut-out
551 Base surface
552 Surrounding surface
606 Supporting cut-out
609 First abutment face
610 Recess
612 Matching face (of recess of tumble disc)
614 Inserting portion (of recess of tumble disc)
650 Catch
652 Catch engagement face
654 First side
655 Second side
656 Link
658 Link
662 Catch supporting face, catch base
664 Latch
670 Second abutment face

The invention claimed is:

1. A tumble disc bearing, comprising:
a tumble disc for axially bearing a rotating anode of an X-ray source, said anode having an anode rotation axis in an axial direction, said tumble disc having a recess; and
a mounting component for supporting the tumble disc; wherein the mounting component comprises:
an inner mounting face for attaching to a support structure; and an outer supporting face;
wherein the tumble disc comprises:
an inner supporting face matching the outer supporting face;
wherein the mounting component is supported in the tumble disc at a tumble position in which the inner supporting face matches the outer supporting face such that the tumble disc is enabled to perform a tumble motion in all directions in relation to the mounting component;
wherein the mounting component is adapted to be inserted in an inserting position traverse to the tumble position into the tumble disc; and
wherein said tumble disc is configured for insertion, in said axial direction, of a catch in said recess for engagement of said catch, with said recess, to fixate the tumble disc against a rotational movement in relation to the support structure while maintaining the tumble motion of the tumble disc.

2. The tumble disc bearing of claim 1, wherein the outer supporting face comprises a supporting cut-out adapted to support said catch.

3. The tumble disc bearing of claim 1, wherein, for matching with said catch, said recess has a matching face, in the said catch comprises an engagement face adapted to engage with said matching face, the engagement face comprising: a first face curvature, and a second face curvature.

4. The tumble disc bearing of claim 1, wherein said mounting component has a supporting cut-out which has both a supporting recess and a first abutment face, said recess of said tumble disc having a second abutment face, said catch comprising:

at least one link adapted to be engaged with said supporting recess to support said catch at the supporting cut-out in said axial direction at the tumble position;
a first side adapted to abut against said first abutment face to support said catch at the supporting cut-out in a rotation direction at the tumble position; and
a second side adapted to abut against said second abutment face to support the tumble disc at said catch in said rotation direction.

5. The tumble disc bearing of claim 4, wherein said rotation direction is in a plane perpendicular to said axial direction.

6. The tumble disc bearing of claim 1,
wherein said mounting component has a supporting cut-out which has both a supporting recess and a first abutment face, said recess of said tumble disc having a second abutment face and, for matching with said catch, a matching face;
wherein at the tumble position said supporting cut-out is extending in said axial direction; and
wherein said catch is a latch adapted to axially engage with the supporting cut-out, the latch comprising:
a first side adapted to abut against said first abutment face to support said latch at the supporting cut-out in a rotation direction at the tumble position;
a second side adapted to abut against said second abutment face to support the tumble disc at said latch in said rotation direction; and
a catch engagement face adapted to engage with said matching face and comprising: a first face curvature, and a second face curvature.

7. The tumble disc bearing of claim 6, wherein said rotation direction is in a plane perpendicular to said axial direction.

8. The tumble disc bearing of claim 1, wherein at least one of:
a) the mounting component comprises at least one mounting recess configured to be engaged with a tool for fixedly attaching the mounting component in said axial direction to the support structure while the mounting component is positioned in the tumble position; and
b) the inner supporting face comprises a first curvature in said axial direction and a second curvature traverse to said axial direction, the first and second curvatures having respective degrees; wherein the degree of the first curvature is equal to the degree of the second curvature.

9. A tumble disc bearing comprising:
a tumble disc for axially bearing a rotating anode of an X-ray source, said anode having an anode rotation axis in an axial direction, said tumble disc having at least one recess; and
a mounting component for supporting the tumble disc; wherein the mounting component comprises:
an inner mounting face for attaching to a support structure; and
an outter supporting face;
wherein the tumble disc comprises:
an inner supporting face matching the outer supporting face;
wherein the mounting component is supported in the tumble disc at a tumble position in which the inner supporting face matches the outer supporting face such that the tumble disc is enabled to perform a tumble motion in all directions in relation to the mounting component;
wherein the mounting component is adapted to be inserted in an inserting position traverse to the tumble position into the tumble disc; and wherein said tumble disc is configured for insertion, in said axial direction, of at least one catch into said at least one recess for engagement of said at least one catch, with said at least one recess, to fixate the tumble disc against a rotational movement in relation to the support structure while maintaining the tumble motion of the tumble disc.

10. The tumble disc bearing of claim 9, wherein the inner supporting face comprises at least one inserting cut-out adapted to inert the mounting component in the inserting position.

11. The tumble disc bearing of claim 10, wherein in the tumble position, each of the tumble disc and the mounting component have respective axial widths, the axial width of the mounting component being smaller than the axial width of the tumble disc such that the mounting component is positioned offset to the tumble disc enabling a catch, from among said at least one catch, to engage with a recess from among said at least one recess while maintaining the tumble motion.

12. The tumble disc of claim 9, wherein said outer supporting face comprises at least one supporting cut-out configured to support the at least one catch.

13. The tumble disc bearing of claim 12, wherein the at least one supporting cut-out is adapted to insert the mounting component at the inserting position.

14. The tumble disc bearing of claim 12, wherein the inner supporting face comprises at least one inserting cut-out adapted to insert the mounting component in the inserting position.

15. A bearing system, comprising:
a supporting structure in form of a shaft;
at least one radial bearing component with an outer bearing face for radially bearing a rotating anode of an X-ray source; and
a tumble disc bearing according to claim 9;
wherein at least one of: the mounting component is fixedly attached to the shaft; and the shaft comprises a cavity for receiving a cooling agent for cooling the X-ray source.

16. The bearing system of claim 15, further comprising: at least one protrusion at the support structure; wherein said at least one protrusion serves as said at least one catch engaging said at least one recess.

17. The bearing system of claim 15; wherein at least one of:
a) the shaft comprises an outer thread, wherein the inner mounting face comprises an inner thread for engaging with the outer thread to an engagement position; and wherein the mounting component is enabled to be mounted in a tight set way to the shaft; and
b) the shaft comprises a retainer, adapted to retain the mounting component to the shaft in said engagement position to enable a tight set mounting of the mounting component to the shaft.

18. An X-ray tube, comprising: a cathode; a rotating anode; a rotor for driving the rotating anode; a bearing system according to claim 15; and an envelope housing the cathode, the rotating anode, the rotor, and the bearing system.

19. An X-ray imagining system, comprising: an X-ray source that includes a tumble disc bearing according to claim 1; a detector; a processing unit; and an object receiving device.

20. A method for mounting a tumble disc bearing according to claim 14 to a shaft of an X-ray tube, the method comprising the steps of:
a) inserting the mounting component at the inserting position in said at least one inserting cut-out or at said at least one supporting cut-out in the outer supporting face;
b) pivoting the mounting component in the tumble disc into a tumble position in which the inner supporting face of the tumble disc matches the outer supporting face of the mounting component such that the tumble disc is enabled to perform a tumble motion in all direction in relation to the mounting component;
c) positioning the mounting component with the thereto attached tumble disc axially onto the shaft; and
d) fixing the tumble disc against a rotational movement in relation to the shaft while maintaining the tumble motion of the tumble disc by engaging a recess from among said at least one recess with a catch from among said at least one catch.

* * * * *